United States Patent
Saquib

(10) Patent No.: US 9,984,438 B1
(45) Date of Patent: May 29, 2018

(54) ROBUST IMAGE REGISTRATION FOR MULTI-SPECTRAL/MULTI-MODALITY IMAGERY

(71) Applicant: Goodrich Corporation, Charlotte, NC (US)

(72) Inventor: Suhail S. Saquib, Shrewsbury, MA (US)

(73) Assignee: Goodrich Corporation, Charlotte, NC (US)

( * ) Notice: Subject to any disclaimer, the term of this patent is extended or adjusted under 35 U.S.C. 154(b) by 19 days.

(21) Appl. No.: 15/019,790

(22) Filed: Feb. 9, 2016

(51) Int. Cl.
  G09G 5/00 (2006.01)
  G06T 3/00 (2006.01)
  G06T 5/00 (2006.01)

(52) U.S. Cl.
  CPC ......... G06T 3/0093 (2013.01); G06T 5/002 (2013.01); *G06T 2207/10004* (2013.01)

(58) Field of Classification Search
  CPC ... G06T 2210/44; G06T 3/0093; G06T 13/00; G06T 13/80; G06T 15/205; G06T 5/006; G06T 3/0018; G06T 3/0006; G06T 15/04; G06F 3/0481; G06F 3/0486; H04N 5/2628; G01T 1/1647
  See application file for complete search history.

(56) References Cited

U.S. PATENT DOCUMENTS

| | | | |
|---|---|---|---|
| 6,594,403 B1 * | 7/2003 | Bozdagi | ......... G06T 7/32 358/450 |
| 7,813,586 B2 | 10/2010 | Gutkowicz-Krusin et al. | |
| 8,194,936 B2 | 6/2012 | Abramoff et al. | |
| 8,587,659 B1 | 11/2013 | Socolinsky et al. | |
| 2008/0019611 A1 * | 1/2008 | Larkin | ......... G06K 9/6203 382/287 |
| 2010/0091334 A1 * | 4/2010 | Qiao | ......... G03G 15/5062 358/3.26 |
| 2015/0334315 A1 | 11/2015 | Teich et al. | |
| 2016/0028966 A1 * | 1/2016 | Sheikh | ......... H04N 5/23296 348/240.2 |

OTHER PUBLICATIONS

A New Correlation Criterion Based on Gradient Fields Similarity by Alain Crouzil, Louis Massip-Pailhes, Serge Castan—CPR 1996; pp. 632-636.
Nonparametric Image Registration of Airborne LiDAR, Hyperspectral and Photographic Imagery of wooded Landscapes by Luheon Lee, Xiaohao Cai, Carola-Bibiane Schonlieb, and David A. Coomes—IEEE Transactions on Geoscience and Remote Sensing, vol. 53, No. 11, Nov. 2015.

* cited by examiner

*Primary Examiner* — Todd Buttram
(74) *Attorney, Agent, or Firm* — Locke Lord LLP; Scott D. Wofsy; Joshua L. Jones

(57) ABSTRACT

A method of registering images includes identifying a block size for a warp estimation on a block by block basis to improve registration of a first image to a master image, and performing the warp estimation on a block by block basis to produce warp data, wherein the warp data includes a warp vector for each block and its associated uncertainty. The method also includes performing a warp model fit on the warp data to produce reduced noise warp data, and applying the reduced noise warp data to the first image for improved registration of the first image to the master image.

19 Claims, 11 Drawing Sheets

(6 of 11 Drawing Sheet(s) Filed in Color)

ROBUST IMAGE REGISTRATION FOR MULTI-SPECTRAL/MULTI-MODALITY IMAGERY

STATEMENT REGARDING FEDERALLY SPONSORED RESEARCH OR DEVELOPMENT

This invention was made with government support under Contract Nos. FA8527-08-D-0008 and FA8818-14-C-0021 awarded by the United States Air Force. The government has certain rights in the invention.

BACKGROUND OF THE INVENTION

1. Field of the Invention

The present disclosure relates to imagery, and more particularly to registration of multiple images such as used in multi-modality and multi-spectral imagery.

2. Description of Related Art

Registration between the different bands of multi-spectral imagery, e.g., acquired by an airborne or space sensor, is particularly challenging as the bands that are spectrally far apart do not correlate very well across the image. For example, bands deep in the IR region have both a reflective and an emissive component whereas the bands in the visual region are purely reflective.

Simple phase correlation to obtain the warp is not very effective in these instances. Similarly, registering images acquired using different modalities such as LiDAR, narrow band spectral, and broad band visual photographic imagery present the same issues.

Conventional methods and systems have generally been considered satisfactory for their intended purpose. However, there is still a need in the art for improved image registration for multi-modal and multi-spectral images. The present disclosure provides a solution for this need.

SUMMARY OF THE INVENTION

A method of registering images includes identifying a coarse warp for estimated registration of a first image to a master image, applying the coarse warp to the first image to produce a dewarped image, and identifying a block size for relative warp estimation on a block by block basis to improve registration of the dewarped image to the master image. The method also includes performing the relative warp estimation on a block by block basis to produce relative warp data, wherein the relative warp data includes a warp vector for each block of the master image and its associated uncertainty. The method also includes fitting a warp model to the relative warp data to produce reduced noise relative warp data, combining the reduced noise relative warp data with the coarse warp to produce a refined warp, and applying the refined warp to the first image for improved registration of the first image to the master image.

The method can include iteratively repeating a process of identifying a coarse warp, applying the coarse warp, identifying a block size, performing the relative warp estimation, fitting a warp model, combining the reduced noise relative warp data with the coarse warp, and applying the refined warp to the first image as described above, wherein on a first iteration of the process, the coarse warp is an identity map, and wherein for each successive iteration of the process, the refined warp of an immediately preceding iteration is used as the coarse warp.

It is also contemplated that the method can include terminating the iterative repeating of the process upon the relative warp meeting a predetermined condition indicative of a predetermined degree of registration between the dewarped image and the master image, wherein on a final iteration of the process, applying the refined warp to the first image produces a final dewarped image registered to the master image. The method can include outputting the final dewarped image and/or a composite of the final dewarped image and the master image.

Identifying a block size can include identifying a successively more refined block size with each successive iteration of the process. Each of the coarse, refined, and relative warps can include a warp vector for each block, wherein applying the respective warp to the first image to produce a dewarped image includes producing a pixel by pixel warp based on the respective warp vectors for the blocks. Producing the pixel by pixel warp can include interpolation of the warp vectors of the blocks to provide a respective warp vector for each pixel.

Fitting a warp model to the relative warp data to produce reduced noise relative warp data can include smoothing the warp vectors relative to one another to reduce occurrences of outliers among the warp vectors and estimation noise. More smoothing can be done where the warp vectors have greater associated uncertainty, and less smoothing can be done where the warp vectors have less associated uncertainty.

The warp model can include a Markov Random Field (MRF) to model smoothness for the relative warp and a Gaussian noise model for modeling uncertainty for the relative warp. Performing the relative warp estimation can include:

computing gradients for each of the dewarped and master images;

computing noise from the gradients of each of the dewarped and master images;

normalizing the gradients and reducing their magnitudes in areas of high noise to produce normalized gradients for each of the dewarped and master images;

dividing the dewarped and master images into blocks of identified block size;

correlating normalized gradient vectors of the dewarped image and master image for each block to produce correlation for all possible translations between the dewarped image and master image blocks;

finding a translation between the dewarped and master image block that yields maximum correlation to compute an estimated warp vector for each block;

computing uncertainty of the estimated warp vector for each block from the correlation; and collecting the estimated warp vector and associated uncertainty for each block to produce the relative warp data.

Computing noise from the gradients of each of the dewarped and master images can include computing noise as $\sigma_I$ wherein $$\sigma_I = 1.253(mn[|\nabla I_x - mn[\nabla I_x]|] + mn[|\nabla I_y - mn[\nabla I_y]|])/2,$$

where I denotes either the dewarped or master image whose noise is being computed, mn[•] denotes an operator that computes the average value of its argument, and $$\nabla I_x = \frac{\partial I}{\partial x}, \nabla I_y = \frac{\partial I}{\partial y}$$

denotes the x and y components of the image gradient

Normalizing the gradient of either the dewarped or master image I and reducing their magnitudes in areas of high noise can include computing $$\nabla \bar{I} = \frac{\nabla I}{\sqrt{|\nabla I|^2 + \sigma_I^2}},$$

where $\sigma_I$ denotes the standard deviation of the noise estimated from the gradient image and $$\nabla I = \nabla I_x + j\nabla I_y,$$

is the complex number formed from the x and y component of the image gradient $$\nabla I_x = \frac{\partial I}{\partial x}, \nabla I_y = \frac{\partial I}{\partial y}.$$

Correlating normalized gradient vectors of the dewarped image and master image for each block to produce correlation for all possible translations between the dewarped image and master image blocks can include computing correlation S wherein $$S = |\text{real}(F^{-1}[F[\nabla \bar{I}_1]F[\nabla \bar{I}_2]^*])|,$$

where * denotes the complex conjugate operation, real(•) extracts the real component of the complex number, $\nabla \bar{I}_1$ is the normalized gradient of the master image block, $\nabla \bar{I}_2$ is the normalized gradient of the dewarped image block, F[•] denotes the Fourier transform operator and $F^{-1}$[•] its inverse.

Computing uncertainty can include computing uncertainty $\hat{C}$ wherein $$\hat{C} = \sum_{d_x, d_y} P(d_x, d_y) \begin{bmatrix} (d_x - \hat{d}_x)^2 & (d_x - \hat{d}_x)(d_y - \hat{d}_y) \\ (d_x - \hat{d}_x)(d_y - \hat{d}_y) & (d_y - \hat{d}_y)^2 \end{bmatrix},$$

where $\{\hat{d}_x, \hat{d}_y\}$ denotes the translation where the correlation S is maximized and the summation is done over all possible translations $\{d_x, d_y\}$ between the blocks of the dewarped and the master image. The probability is computed as $$P(d_x, d_y) = \frac{L(d_x, d_y)}{\sum_{d_x, d_y} L(d_x, d_y)},$$

where the likelihood is computed as $$L(d_x, d_y) = \exp\left(-\left(\frac{\max S}{S(d_x, d_y)}\right)^2\right),$$

from the correlation S and max S denotes the maximum value of the correlation S over all possible translations.

In certain embodiments, identifying a coarse warp for estimated registration of a first image to a master image includes identifying a respective coarse warp for each of a plurality of first images, applying the coarse warp includes applying the respective coarse warp to each of the first images to produce a respective dewarped image for each of the first images, identifying a block size includes identifying a respective block size for each of the first images for a warp estimation on a block by block basis to improve registration of the respective dewarped images to the master image, and performing the warp estimation includes:

forming pairs of the first images and master image to one another wherein at least one of the pairs of images includes one of the first images and the master image;

performing a pair-wise relative warp estimation for each pair on a block by block basis to produce pair-wise relative warp data, wherein the pair-wise relative warp data includes a warp vector for each block and its associated uncertainty; and computing respective set of relative warp data for each of the dewarped images with respect to the master image from the pair-wise relative warp data;

performing a warp model fit on each set of relative warp data to produce a respective set of reduced noise relative warp data for each dewarped image;

combining the respective set of reduced noise relative warp data with the respective coarse warp to produce a respective refined warp for each respective dewarped image; and applying the respective refined warp to the each respective first image for improved registration of the first images to the master image.

Computing a set of respective relative warp data for each of the dewarped images with respect to the master image from the pair-wise relative warp data can include:

forming a tree of the pair-wise groupings with the master image as a root and each first image as a node with a connection between each pair of paired images;

grouping dewarped images by the depth in the tree, wherein depth in the tree is a measure of how far removed a given node is from the root;

wherein for group 1 images, the pair-wise relative warp data is for a relative warp with respect to the master image;

wherein for group i+1 images, the relative warp data with respect to the master is obtained by summing the pair-wise relative warp of the respective image with corresponding relative warp data of the group i image with respect to the master image; and repeating computation for each group in the order of increasing group number until relative warp with respect to master image is computed for all first images.

A system for registering images includes a module configured to implement machine readable instructions to perform one or more of the method embodiments described above.

A method of registering images includes identifying a block size for a warp estimation on a block by block basis to improve registration of a first image to a master image, and performing the warp estimation on a block by block basis to produce warp data, wherein the warp data includes a warp vector for each block and its associated uncertainty. The method also includes performing a warp model fit on the warp data to produce reduced noise warp data, and applying the reduced noise warp data to the first image for improved registration of the first image to the master image.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
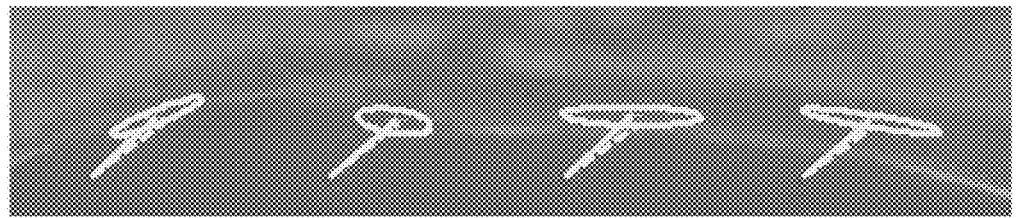
FIG. 1 schematically shows an image with two mis-registered bands displayed in red and cyan, respectively, and the estimated warp vector (solid yellow line) at each grid point along with the respective uncertainty ellipses.

Reference will now be made to the drawings wherein like reference numerals identify similar structural features or aspects of the subject disclosure. For purposes of explanation and illustration, and not limitation, a partial view of an exemplary embodiment of the image registration method in accordance with the disclosure is shown in FIG. 8 and is designated generally by reference character 100. Other embodiments of the method in accordance with the disclosure, or aspects thereof, are provided in FIGS. 1-7 and 9-11, as will be described. The systems and methods described herein can be used for multi-modal/multi-spectral image registration.

The registration problem between different spectral bands or modalities is inherently ill-posed because there may not be information in the acquired imagery to perform the matching between the two bands. Information may be present in some regions of the image and may be completely missing in other areas depending on the image content. To fill in this missing information and to clean up bad warp estimates extracted from the data, a priori information needs to be utilized. In embodiments of systems and methods disclosed herein, a warp model that embodies this a priori information is employed to make the problem well-posed. Consequently, the exemplary embodiment of a registration algorithm disclosed herein has two components: first, a data extraction module that estimates the warp between the two bands by performing some sort of matching using the image data; and second, a clean-up step that employs the warp model to correct any error in the warp estimates.

The warp between the reference (source) and the warped (destination) band can be quite non-linear and highly distorted depending on the motion of the airborne or space platform. Given a similarity measure between the two bands, one approach is to determine the unknown warp by an optimization method that maximizes the similarity. Such a global approach tends to be computationally intensive as the optimizer iteratively tries to de-warp the destination band in a quest to maximize the similarity measure. Guesses for trying out different warps in subsequent iterations are driven by gradient information of the similarity measure being maximized and may take many of iterations to converge. With an eye to the computational viability of the exemplary embodiment of an algorithm disclosed herein, one can take the view that any highly distorted map can be approximated by a simple translation locally at a sufficiently fine scale. The advantage of this approach that the optimal local translation can be obtained in closed form for a suitably formulated similarity metric. The validity of the local translation assumptions can be arbitrarily improved in an iterative scheme where the previously estimated warp is applied to the destination image to bring it closer to the source. Such an iterative scheme is still computationally superior to the global approach since each iteration essentially has a closed form estimate.

There are many similarity measures proposed in the literature that may be used. A suitable similarity measure is both robust to non-matching content between the two bands and computationally efficient to optimize under a translation only model. Taking a cue from how the eye performs this task by finding correspondences between edges in the two images, one can choose to use the correlation of the gradient vector field between the bands as a similarity measure. To lend robustness to the metric, one can normalize the magnitude of the vector so only directionality is considered in the correlation and the magnitude is disregarded. Also, in noisy areas of the image, the gradient vector field will have a random orientation. These areas need to be deemphasized in the metric. Towards this end, one can estimate the noise level in each band and if the power of the gradient vector is on the same order or lower than the noise power, the vector field is smoothly attenuated towards zero.

Let I(x, y) denote the image pixel value at spatial location (x, y). For simplicity of notation, the x and y location indices are dropped herein when the underlying operation is the same for all locations and is not relevant. Let $$\nabla I_x = \frac{\partial I}{\partial x}, \nabla I_y = \frac{\partial I}{\partial y}$$

denote the partial derivatives of I with respect to x and y respectively. The Sobel operator or any other gradient operator may be used to compute these on discrete images. The x and y gradients are combined to form a complex number $$\nabla I = \nabla I_x + j \nabla I_y,$$

where $j=\sqrt{-1}$. The complex gradient is normalized as $$\nabla \bar{I} = \frac{\nabla I}{\sqrt{|\nabla I|^2 + \sigma_I^2}}, \quad (1)$$

where $\sigma_I$ denotes the standard deviation of the noise estimated from the gradient image (see below regarding eq. (5)). The normalization of eq. (1) serves to ignore the magnitude of the gradient vector and reduces it to zero in areas where the noise power is relatively large compared to the signal power, $\sigma_I^2 \gg |\nabla I|^2$.

For a local translation only model, the correlation between the normalized vector gradient field for all possible translations can be efficiently computed using a complex FFT (Fast Fourier Transform). The optimal translation is then obtained by simply choosing the location at which the correlation is maximized. Employing FFTs renders the translation to be circular shifts on the blocks being compared. Windowing is utilized to mitigate edge effects in the blocks and the estimated translation between the blocks should only be considered accurate if it is less than or equal to about half the block size.

Let $F[\bullet]$ denote the Fourier transform operator and $F^{-1}[\bullet]$ its inverse. Bold case is used herein to denote matrices. For example, I denotes a matrix formed from all the image pixels in a block and $\nabla \bar{\mathbf{I}}$ denotes a matrix formed from the normalized gradient of all the pixels in a block. Then the correlation (measure of similarity) between images $I_1$ and $I_2$ for all translation is given as $$\mathbf{S} = |\mathrm{real}(F^{-1}[F[\nabla \bar{\mathbf{I}}_1]F[\nabla \bar{\mathbf{I}}_2]^*])|, \quad (2)$$

where * denotes the complex conjugate operation and real(•) extracts the real component of the complex number. The normalized gradient may optionally be multiplied by a windowing function that smoothly goes down to zero at the edges of the block before the Fourier transform in computed in eq. (2). The optimal translation between images $I_1$ and $I_2$ is obtained by finding the location at which the correlation (similarity) is maximized $$\{\tilde{d}_x, \tilde{d}_y\} = \underset{\{x,y\}}{\mathrm{argmax}} S(x, y), \quad (3)$$

where $S(x, y)$ is the correlation value extracted from S at location (x, y), and computing $$\hat{d}_x = (\tilde{d}_x + N/2)(\mathrm{mod}\ N) - N/2,\ \hat{d}_y = (\tilde{d}_y + M/2)(\mathrm{mod}\ M) - M/2. \quad (4)$$

The mapping in eq. (4) takes into account that the correlation is computed using FFTs. Here N and M denote the block size (FFT size) in the x and y directions respectively. The optimal translation $\{\hat{d}_x, \hat{d}_y\}$ may be computed to a sub-pixel accuracy by either using a high order (cubic) interpolation of S at sub-pixel locations in eq. (3) or fitting a local quadratic to S in the neighborhood of the peak location computed in eq. (3) and then computing the location of the maximum of the fitted quadratic function.

For a Gaussian noise field, the gradient will be Gaussian distributed and estimating the noise level just involves computing the standard deviation of the gradient image. As is well known, the gradient of noise-free natural images on the other hand tends to have a heavy tail distribution since most images are composed of flat-areas with sharp edges. The gradient of the observed image will tend to have a mixture distribution that is partly Gaussian due to the additive noise and partly Laplacian or more heavy tailed with large outlying values due to presence of edges. To obtain the standard deviation of the underlying noise, one can use a robust estimator that can reject the large outliers such as that obtained from mean absolute deviation (MAD) estimator $$\sigma_I = 1.253(mn[|\nabla I_x - mn[\nabla I_x]|] + mn[|\nabla I_y - mn[\nabla I_y]|])/2, \quad (5)$$

where $mn[\bullet]$ denotes an operator that computes the average value of its argument.

The correlation surface has information embedded in it that conveys the reliability of the estimated translation. If the vector fields are highly correlated, the correlation surface will peak at the optimal translation and rapidly fall away to low values for any other value of translation. The correlation surface will be flatter in regions where there is not much correlation between the gradient fields.

One can take the view that the correlation value for a particular translation between the images is directly related to the likelihood that the particular shift is the true shift. Higher correlation values imply higher likelihood of that particular shift being the true shift and lower correlation values imply the opposite. There are several functional forms that achieve this requirement. One can choose to go with the form of the Gaussian density with the inverse normalized correlation playing the role of distance to obtain the likelihood as $$L(d_x, d_y) = \exp\left(-\left(\frac{\max S}{S(d_x, d_y)}\right)^2\right), \quad (6)$$

where one normalizes the correlation by the maximum correlation over all translations to obtain a unitless number between 0 and 1. The likelihood value is normalized to sum to 1 over all translations to obtain the probability of any particular translation $$P(d_x, d_y) = \frac{L(d_x, d_y)}{\sum_{d_x, d_y} L(d_x, d_y)}. \quad (7)$$

The covariance (uncertainty) of the optimal translation is obtained as $$\hat{C} = \sum_{d_x, d_y} P(d_x, d_y) \begin{bmatrix} (d_x - \hat{d}_x)^2 & (d_x - \hat{d}_x)(d_y - \hat{d}_y) \\ (d_x - \hat{d}_x)(d_y - \hat{d}_y) & (d_y - \hat{d}_y)^2 \end{bmatrix}. \quad (8)$$

Note that the covariance computed by eq. (8) may have an arbitrary scale factor but this is of no consequence because one only need be interested in the relative uncertainty between the translation vectors obtained at each grid point and not the absolute uncertainty.

FIG. 1 schematically shows two mis-registered bands displayed in red and cyan, respectively, and the estimated warp vector (solid yellow line pointing from the red dot to the cyan plus) at each grid point along with the respective uncertainty ellipses. In this example, the uncertainty ellipses align along the coastline illustrated as there is strong registration information perpendicular to the coastline but more uncertainty along the coastline in each of the local blocks centered on the grid points. Note that in any local region, the coastline can be aligned well in a direction perpendicular to the coastline but not very well along the coastline. This explains the directionality of the uncertainty ellipses.

Figure 2:
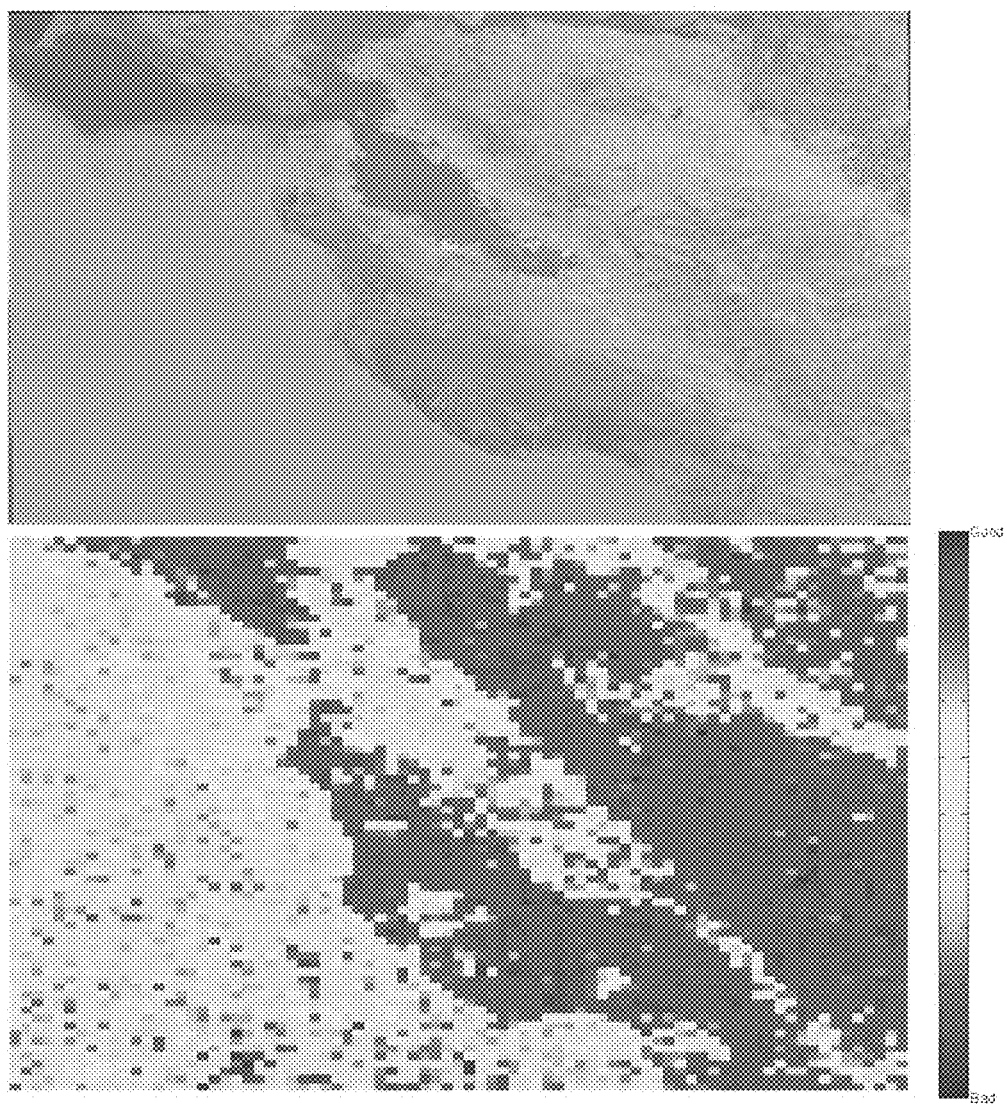
FIG. 2 shows a map of the registration information available for the LandSat image shown on the top with blue band (450-520 nm) displayed in red and the thermal band (1040-1250 nm) displayed in cyan.

The uncertainty estimates can also be used to generate a map of where registration information is available and reliable and where it is not. FIG. 2 schematically shows a LandSat image on the top with blue band (450-520 nm) displayed in red and the thermal band (1040-1250 nm) displayed in cyan and the corresponding registration information computed by the algorithm below the image. The largest eigen value of the uncertainty ellipses is used to generate the registration information map and is displayed using a log scale. Note that in this particular example, the blue band does not correlate very well with the thermal band in the region of cloud cover and open water. The red areas in the map denote good registration information while the blue areas denote little or no registration information as is the case in the cloud cover and open water regions. No registration information can be extracted in this region and it is necessary to rely on some a priori information to compute the warp in this region.

The local translation data extracted as described above is noisy and highly unreliable in areas where there is no registration information between the bands. A warp model formulated using a priori information of the expected warp can serve to consolidate and transfer information from different areas of the image to obtain a refined estimate of the warp that optimally trades-off the data information and the a priori information.

A warp model that can be used for this purpose is a Markov random field (MRF) warp model. To model this scenario, all one need assume is that the warp is locally smooth. The x and y components are modeled as a Markov Random Field (MRF). Each node or grid point (center point of the block used to estimate the translation) is connected to its eight neighbors to ensure local smoothness. This creates a mesh that ties all nodes together and information is propagated from one end of the image to another taking into account the data uncertainties. The optimal estimate is adjusted to obtain the smoothest possible warp without deviating too much from the data values in regions where the estimates are reliable. A user specified smoothness parameter governs this trade-off. Although the MRF modeling the x and y components are independent, information is transferred between the two models via the data, which has coupled uncertainties in the x and y directions.

Let the arrow → notation on top of a variable denote a column vector containing the x and y component of that variable. Using this notation, $\vec{d}_{ij}$ denotes the warp vector estimated from the image data for grid point (i, j) as in eqs. (3) and (4). When the subscript ij is removed, $\vec{d}$ denotes the collection of warp vectors over all the grid points $\{i=1, \ldots, n, j=1, \ldots m\}$, where n and m are the number of blocks laid out in the x and y direction respectively. The maximum a posteriori (MAP) estimate of the warp denoted as $\overline{\vec{d}}$ is given as $$\overline{\vec{d}} = \arg\min_{\vec{d}} \sum_{i,j} \left( \left(\vec{d}_{ij} - \vec{\bar{d}}_{ij}\right)^t \hat{C}_{ij}^{-1} \left(\vec{d}_{ij} - \vec{\bar{d}}_{ij}\right) + \lambda \sum_{\{l,k\} \in N_{ij}} \|\vec{d}_{ij} - \vec{d}_{lk}\|_p^p \right), \quad (9)$$

where t denotes the transpose operator, $\|\bullet\|_p$ denotes the p norm of the vector, $N_{ij}$ denotes the neighborhood of the grid point (i, j) specified by the MRF, and $\hat{C}_{ij}$ denotes the covariance matrix (uncertainty) at grid point (i, j) estimated using eq. (8). The smoothness parameter $\lambda$ is user specified and weighs the importance of the MRF smoothing model with respect to the data model.

When p=2, the MRF becomes a Gaussian MRF (GMRF) and the optimization problem of eq. (9) can be computed in closed form. Although it requires the inversion of a very large matrix, the sparsity of the matrices (consequence of the Markov assumption that has only local linkages between nodes) renders the problem tractable and computationally efficient.

Figure 3:
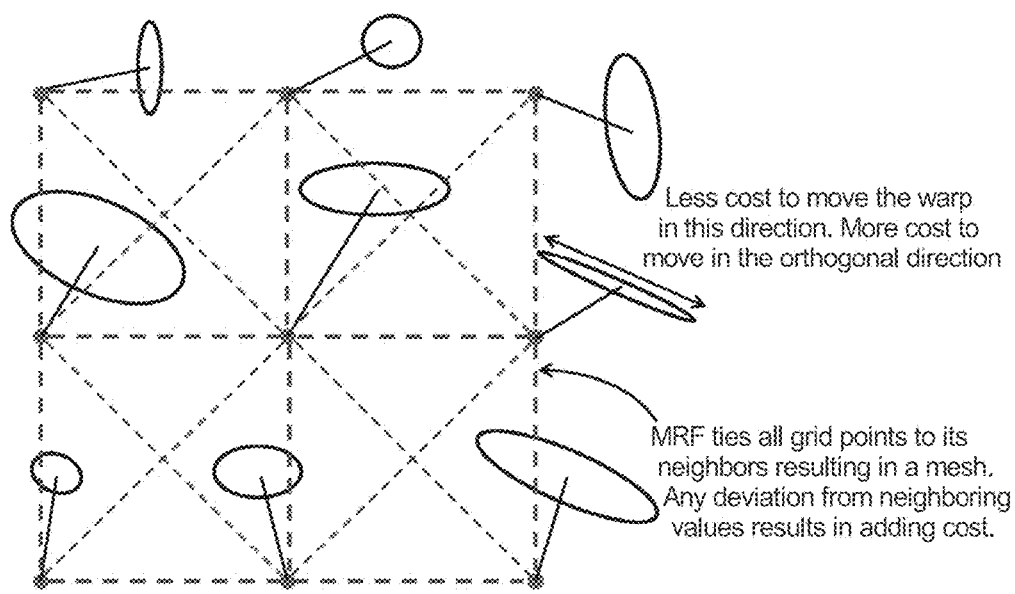
FIG. 3 shows graphically the cost optimization undertaken by MAP for MRF model.
Figure 4:
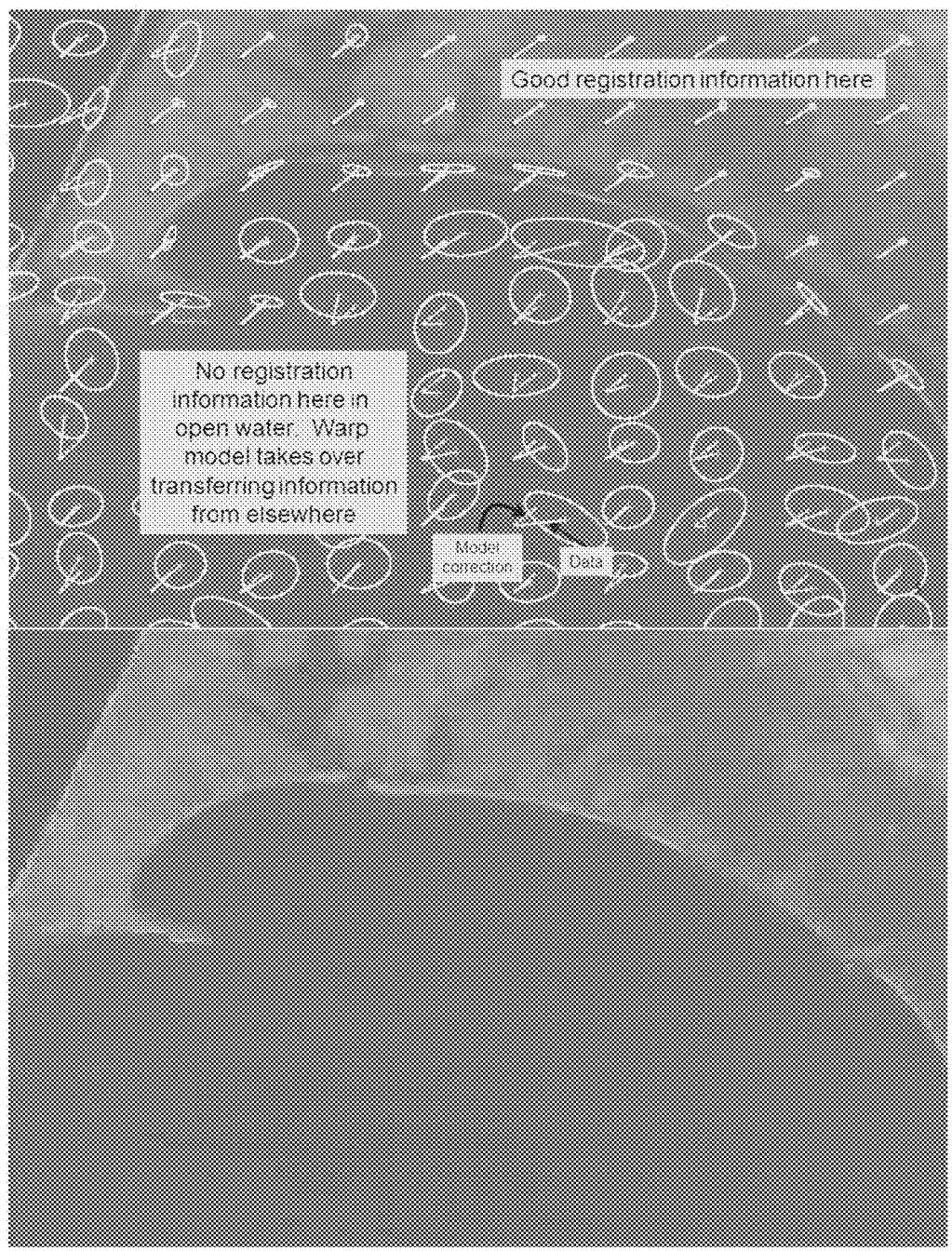
FIG. 4 shows on the top how the MAP estimate transfers information optimally across a LandSat image (blue and thermal band displayed as a red-cyan image) from regions of good registration information to other areas, and the image registered by an exemplary embodiment of an algorithm in accordance with this disclosure is shown on the bottom.

FIG. 3 shows graphically the cost optimization undertaken by MAP for MRF model. The grid points are connected by two independent MRFs for the x and y components. Each grid point also has warp vector with some uncertainty associated with it. The MAP estimate tries to minimize the curvature of the warp while trying its best to keep the warp vectors within their circle of uncertainties. FIG. 4 shows this principle applied to real LandSat imagery. The LandSat image in FIG. 4 (blue and thermal band displayed as a red-cyan image) on the top shows how the MAP estimate transfers information optimally across the image from regions of good registration information to other areas. The solid yellow vector shows the original data extracted estimate while the dashed yellow vector shows the MAP estimate. The image registered by the algorithm disclosed herein is shown on the bottom.

Once the warp vectors have been estimated between images $I_1$ and $I_2$ as in eq. (9) for all the grid points, image $I_2$ needs to be dewarped to bring it into registration with $I_1$. To accomplish this, the warp needs to be evaluated at each pixel location. Towards this end, the collection of warp vectors $\overline{\vec{d}}$ at all grid points can be regarded as a function that is specified at the coordinates of each grid point $(x_i, y_j)$ and can be evaluated at some arbitrary coordinates (x, y) by employing an interpolation method. This interpolation is denoted herein as $\overline{d}_x(x, y)$ and $\overline{d}_y(x, y)$ for the x and y components of the warp respectively at any location (x, y). The dewarped pixel values of image 2 denoted as $\hat{I}_2$ is obtained as $$\hat{I}_2(x,y) = I_2(x - \overline{d}_x(x,y), y - \overline{d}_y(x,y)). \quad (10)$$

Note that eq. (10) requires three interpolations: two for the interpolation of the x and y warps from the warp data $\overline{\vec{d}}$ and one interpolation on the image itself that now need to be evaluated at a new location given by the warp.

Estimating the warp is a highly non-convex problem and the likelihood of the algorithm getting bogged down in a local minima is high especially if the warp is severe. A multi-resolution scheme can usually be employed to combat this problem. It also fits naturally in the iterative scheme outlined above as the low-resolution estimates can serve as good guesses to initialize the next resolution and make the local translation model more accurate.

The multi-resolution method disclosed herein differs from existing methods in the literature in one significant way: the image data is never decimated and retains its full resolution even for coarse resolution warp estimates. The reason is that the high-frequency edge data carries all the registration information and reducing the resolution of the image is precisely the wrong thing to do as all of this edge data will be lost and the matching will be performed on mid- and low-frequencies in the image. Instead, lower resolution estimates of the warp are obtained by using larger block sizes and placing less of them across the image. After each level, the image is de-warped with the current estimate and the block sizes are reduced to hone in on the true warp.

As far as computation is concerned, lower resolutions estimates are still faster to compute than high resolution estimates. Even though the block sizes are larger at low-resolution, the efficient scaling of the FFT algorithm (N log N, N being the number of pixels in the block) together with sparse placement of the blocks (number or blocks are reduced as the square of the resolution factor) makes for an overall computation cost that is reduced at lower resolutions. The bigger cost is the resampling of the warped band that still has to be done at the highest resolution.

Figure 5:
FIG. 5 shows an example image and the progression of the warp estimation as the block sizes are reduced and placed more finely, image courtesy of the Rochester Institute of Technology.

FIG. 5 shows an example image (courtesy of the Rochester Institute of Technology) and the progression of the warp estimation as the block sizes are reduced and placed more finely. The warp is shown as a quiver plot with error ellipses drawn based on the uncertainty from the gradient field correlation. The dashed blue boxes show the block size at each level and represents the area of the underlying image that was correlated to determine the optimal shift. Note that for illustrative purposes, FIG. 5 displays the absolute warp between the two original bands at each level even though it is the incremental correction that is computed with gradient field correlation between the original master band and the de-warped destination band using the previous resolution estimate. So the images that are matched are progressively coming closer in alignment and the incremental warp is going down to zero. Note that the image resolution is kept the same at all levels.

Figure 6:
FIG. 6 shows what the image looks like as the algorithm proceeds from coarse to fine resolutions, e.g., how the two bands come into alignment in a multi-resolution scheme, image courtesy of the Rochester Institute of Technology.

FIG. 6 shows what the image looks like as the algorithm proceeds from coarse to fine resolutions, e.g., how the two bands come into alignment in the multi-resolution scheme. The top image in FIG. 6 is the starting unregistered pair, the lower three images show image registration as the block size is reduced from 128×128 down to 32×32 pixels.

The exemplary embodiment of the algorithm disclosed herein can utilize band hopping for leveraging multi-spectral imagery. The typical or traditional approach to registration of multi-spectral imagery is to correlate all bands to a master band. Although this approach is simple, it does not effectively leverage all of the information provided by multi-spectral imagery since bands that are spectrally adjacent have a higher likelihood to correlate well than bands that are far apart. This idea is leveraged in the registration algorithm disclosed herein. The user can specify a reference band for each of the bands that are being processed. The master band is designated as the band that references itself. The algorithm then makes a graph of the connections between the bands to figure out a path from any individual band to the master band. The overall warp is obtained by simply concatenating the relative warp between the bands in the path to the master band. The concatenation involves the resampling of the relative warps on arbitrary grids. For computational efficiency, the number of concatenations is minimized by figuring out the optimal order in which the concatenations should be performed. This is equivalent to figuring out common portions of the path shared among the bands and not recomputing those paths making the algorithm recursive and efficient.

Figure 7:
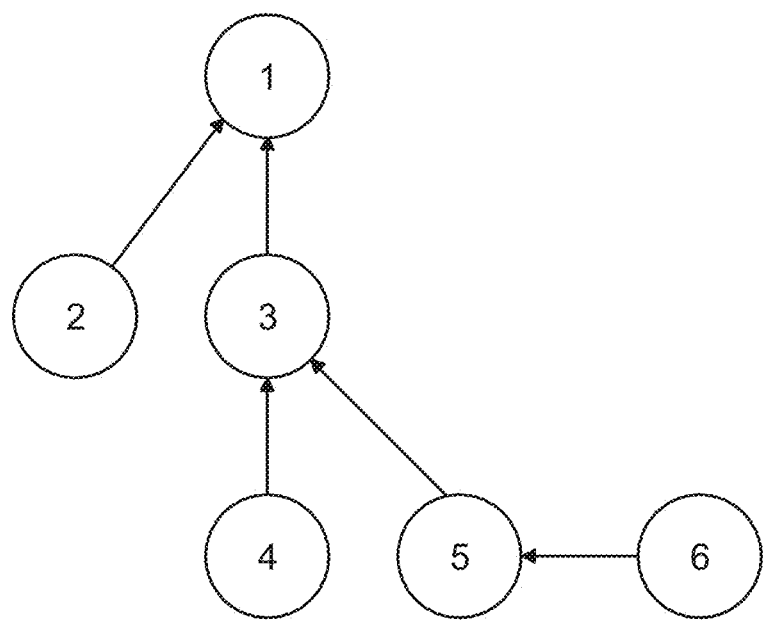
FIG. 7 shows an example of a graph constructed from user specified band pairings for a 6 band system with the master band at the root.
Figure 8:
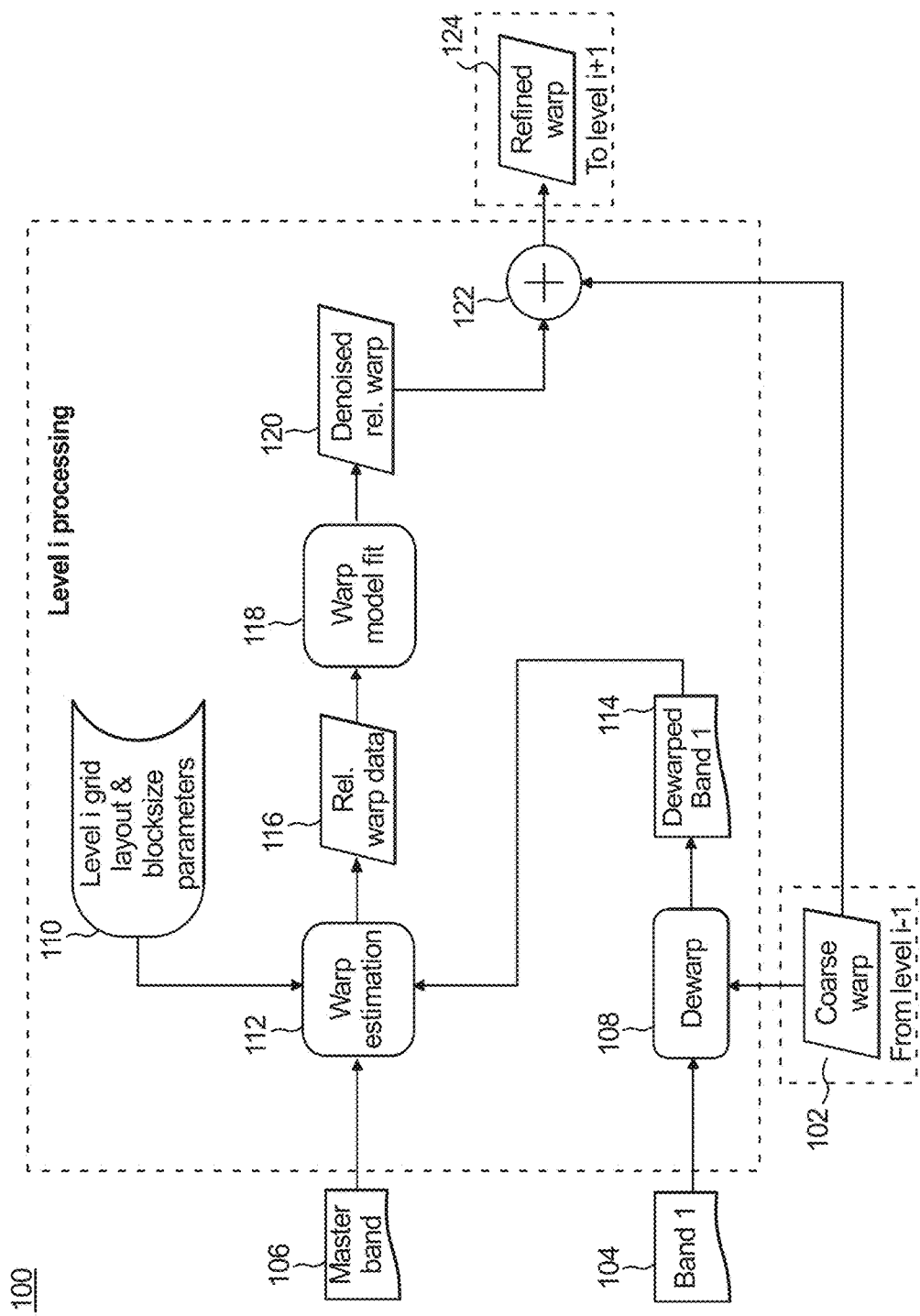
FIG. 8 is a schematic view of an exemplary embodiment of a method of image registration in accordance with the present disclosure, showing a process overview including warp estimation.

FIG. 7 shows an example of a graph constructed from user specified band pairings for a 6 band system with the master band at the root, i.e., the circle numbered 1 in FIG. 7. The graph shows the path each band needs to take to arrive at the master band. The optimal band ordering for computing the overall warp with respect to the master band is {2, 3, 4, 5, 6}. In this manner, each band requires at most a single concatenation to arrive at the master band.

To obtain the warp data for bands k→m at each grid point location ($x_i$, $y_j$) concatenating the warp data for bands k→l and bands l→m, the following operation is performed $$\hat{d}_{x,k \to m}(x_i,y_j) = \hat{d}_{x,k \to l}(x_i,y_j) + \hat{d}_{x,l \to m}(x_i - \hat{d}_{x,k \to l}(x_i,y_j), y_j - \hat{d}_{y,k \to l}(x_i,y_j)) \quad (11)$$

$$\hat{d}_{y,k \to m}(x_i,y_j) = \hat{d}_{y,k \to l}(x_i,y_j) + \hat{d}_{y,l \to m}(x_i - \hat{d}_{x,k \to l}(x_i,y_j), y_j - \hat{d}_{y,k \to l}(x_i,y_j)), \quad (12)$$

where the subscripts in the warp data specify which band-to-band data is being utilized. Note that the warp data for bands l→m is interpolated to the warped location specified by bands k→l. A similar interpolation operation can be applied while computing the new uncertainties. However, to reduce complexity, one can simply add the covariances for the corresponding warps $$\hat{C}_{ij,k \to m} = \hat{C}_{ij,k \to l} + \hat{C}_{ij,l \to m}. \quad (13)$$

The error made in eq. (13) by not interpolating covariances of bands l→m at the warp location obtained from bands k→l goes away in the iterative process as all the bands come into registration and the warp vector goes to zero.

In the example shown in FIG. 7, bands 2 and 3 require no concatenation since their warp data is already with respect to the master band 1. Band 4 is updated next using eqs. (11-13) to obtain the warp 4→1 using warps 4→3 and 3→1. Band 5 is updated next to obtain the warp 5→1 using warps 5→3 and 3→1. And finally band 6 is updated to obtain the warp 6→1 using warps 6→5 and 5→1.

When specifying the band pairings, it should be kept in mind that the uncertainties do add up as multiple hops are made from a band to reach the master band. The algorithm keeps track of these uncertainties as the paths are traversed and warps are concatenated. Specifying only spectrally adjacent pairings may not be ideal for this reason and there is a trade-off involved between minimizing the number of hops and choosing band pairing that are spectrally similar. It may improve performance to arrange the bands into a small number of groups and make connections between the groups with an eye to minimizing the depth of the graph.

With reference now to FIG. 8, method 100 of registering images includes identifying a coarse warp 102 for estimated registration of a first band or image 104 to a master band or image 106. The coarse warp is applied to the first image 104 to produce a dewarped image 114, e.g. at dewarp 108 in FIG. 8. A block size is identified, e.g., in parameters 110, for relative warp estimation 112 on a block by block basis to improve registration of the dewarped image 114 to the master image 106. Method 100 also includes performing the relative warp estimation 112 on a block by block basis to produce relative warp data 116, wherein the relative warp data 116 includes a warp vector for each block of the master image 106 and its associated uncertainty. The method 100 also includes fitting 118 a warp model to the relative warp data 116 to produce reduced noise relative warp data 120, combining 122 the reduced noise relative warp data 120 with the coarse warp 102 to produce a refined warp 124, and applying the refined warp to the first image 104 for improved registration of the first image 104 to the master image 106. The warp model can include a Markov Random Field (MRF) to model smoothness for the relative warp and a Gaussian noise model for modeling uncertainty for the relative warp as described above in eq. (9).

The method 100 can include iteratively repeating the process of identifying a coarse warp 102, applying the coarse warp to the first image 104 to produce a dewarped image 114, identifying a block size, performing the relative warp estimation 112, fitting 118 a warp model, combining 122 the reduced noise relative warp data 120 with the coarse warp 102, and applying the refined warp 124 to the first image 104 as described above. On a first iteration of the process, e.g., Level 1 processing, the coarse warp 102 is an identity map. For each successive iteration of the process (Level 2 to i processing), the refined warp 124 of an immediately preceding iteration (Level i−1) is used as the coarse warp 102.

It is also contemplated that the method can include terminating the iterative repeating of the process upon the relative warp 116 meeting a predetermined condition indicative of a predetermined degree of registration between the dewarped image 114 and the master image 106, wherein on a final iteration of the process (Level i+1 processing), applying the refined warp 124 to the first image 104 produces a final dewarped image registered to the master image 106. The method can include outputting the final dewarped image and/or a composite of the final dewarped image and the master image 106, e.g., not shown in FIG. 8 but see the stop 226 in FIG. 11.

Identifying a block size, e.g., in parameters 110, can include identifying a successively more refined block size with each successive iteration of the process. The refined warp 124 can include a warp vector for each block. Applying the coarse warp 102 to the first image 104 to produce a dewarped image 114 can include producing a pixel by pixel warp based on the warp vectors for the blocks. Producing the pixel by pixel warp can include interpolation of the warp vectors of the blocks to provide a respective warp vector for each pixel.

Fitting 118 a warp model to the relative warp data 116 to produce reduced noise relative warp data 120 can include smoothing the warp vectors relative to one another to reduce occurrences of outliers among the warp vectors and estimation noise. More smoothing can be done where the warp vectors have greater associated uncertainty, and less smoothing can be done where the warp vectors have less associated uncertainty.

Figure 10:
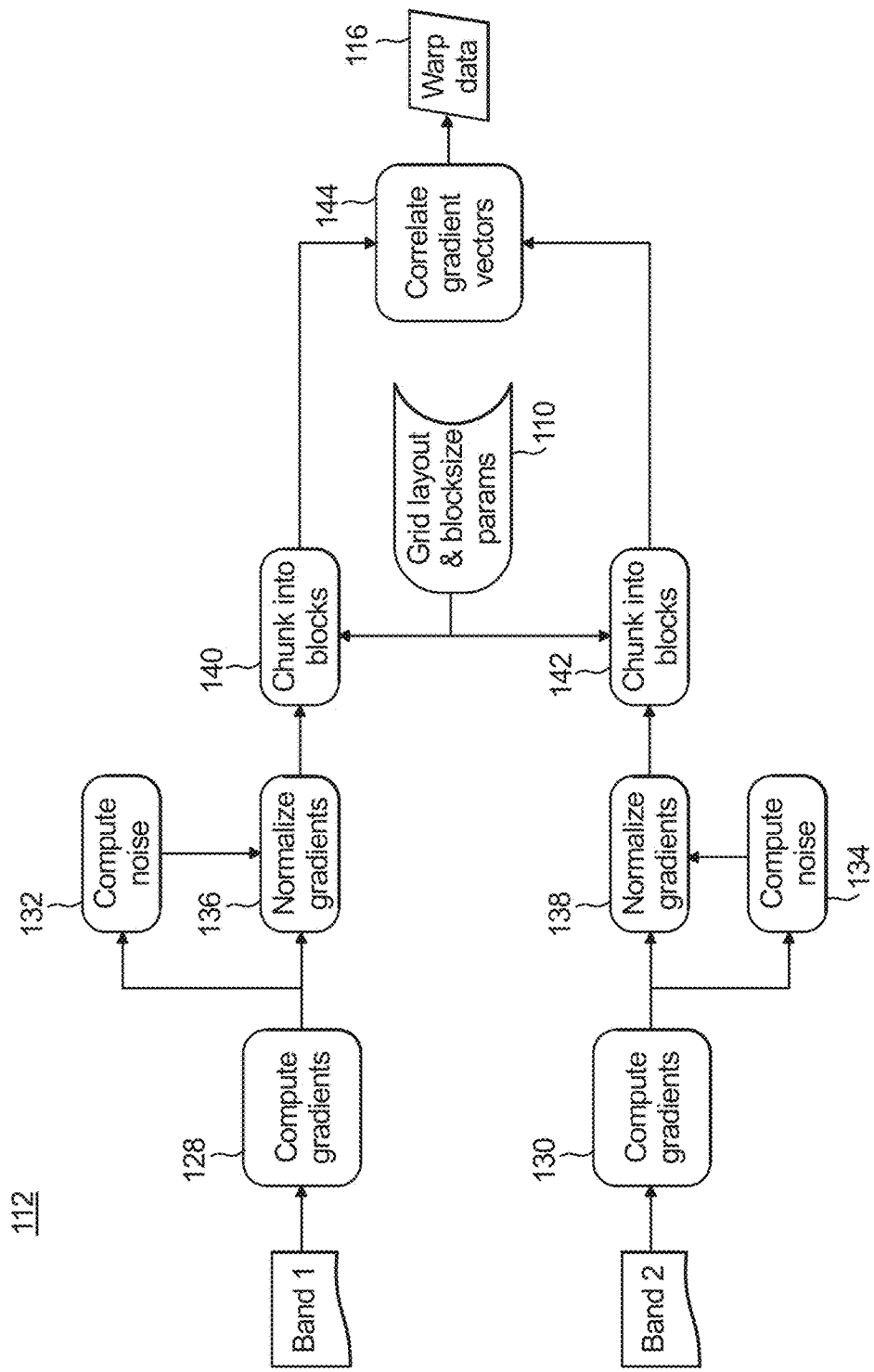
FIG. 10 is a schematic view of a portion of the methods of FIGS. 8 and 9, showing warp estimation for a first image versus a second image.

With reference now to FIG. 10, performing the relative warp estimation 112 can include computing gradients 128 and 130 for each of the master and dewarped and images, e.g., "band 1" and "band 2," respectively as indicated in FIG. 10. Noise is computed 132 and 134 from the gradients of each of the master and dewarped images, as explained above with respect to eq. (5). The gradients are also normalized 136 and 138 and their magnitudes are reduced in areas of high noise to produce normalized gradients for each of the master and dewarped images, as explained above with respect to eq. (1). The dewarped and master images are divided 140 and 142 into blocks of identified block size, e.g., as identified in parameters 110. The warp estimation 112 includes correlating 144 gradient vectors of the dewarped image and master image for each block, e.g., using eq. (2), finding a position of maximum correlation to compute an estimated warp vector for each block, computing uncertainty of the estimated warp vector for each block from correlating the gradient vectors, e.g., using eq. (8) as explained above, and collecting the estimated warp vector and associated uncertainty for each block to produce the relative warp data 116.

Figure 9:
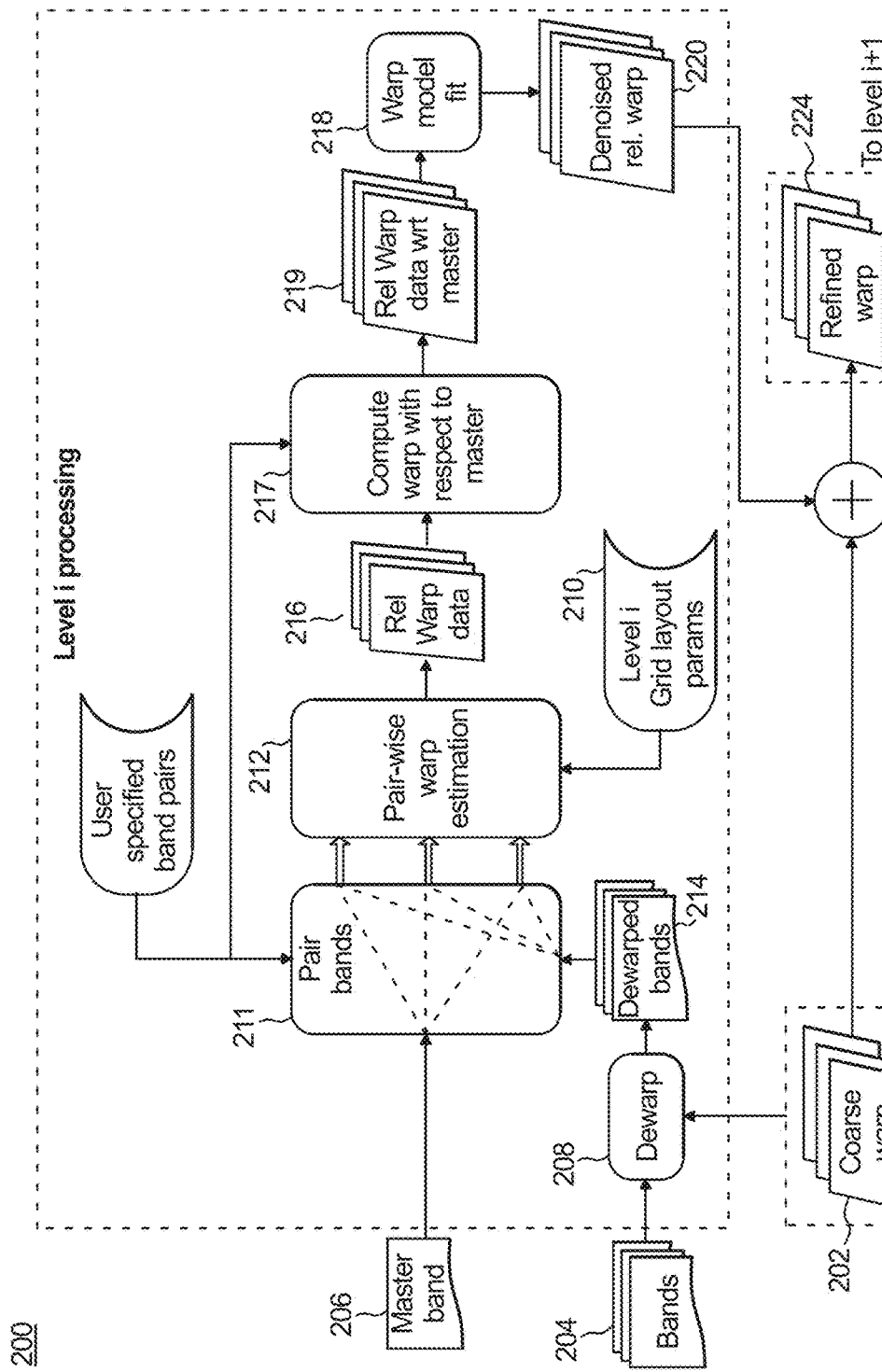
FIG. 9 is a schematic view of another exemplary embodiment of a method of image registration in accordance with the present disclosure, showing a process for registering multiple images of different bands/modes.

Referring now to FIG. 9, it has been described above how a single image, e.g., image 104, can be registered to a master image 106; however, in method 200, a similar process is provided wherein multiple images 204 can be registered to master image 206. Method 200 includes identifying a respective coarse warp 202 for estimated registration of a plurality of first images 204 to the master image 206. A respective coarse warp 202 is applied, at dewarp operation 208 in FIG. 9, to each of the first images 202 to produce respective dewarped images 214, e.g., dewarped bands in FIG. 9, for each of the first images 204. In method 200, identifying a block size includes identifying a respective block size for each of the first images 204 for a warp estimation on a block by block basis to improve registration of the respective dewarped images to the master image, e.g., using parameters 210.

Performing the warp estimation is done on a pairwise basis. This includes forming 211 pairs of the first images 204 and master image 206 to one another wherein at least one of the pairs of images includes one of the first images 204 and the master image 206. A pair-wise relative warp estimation 212 is then performed for each pair on a block by block basis to produce pair-wise relative warp data 216. The pair-wise relative warp data 216 includes a warp vector for each block and its associated uncertainty. A respective set of relative warp data 219 is computed 217 for each of the dewarped images 214 with respect to the master image 206 from the pair-wise relative warp data 216. A warp model fit 218 is performed on each set of relative warp data 219 to produce a respective set of reduced noise relative warp data 220 for each dewarped image 214. The respective set of reduced noise relative warp data 220 is combined with the respective coarse warp 202 to produce a respective refined warp 224 for each respective dewarped image 214. The respective refined warp 224 is applied to the each respective first image 204 for improved registration of the first images 204 to the master image 206.

Computing 217 a set of respective relative warp data 219 for each of the dewarped images 214 with respect to the master image 206 from the pair-wise relative warp data 216 can include forming a tree of the pair-wise groupings with the master image as the root and each first image as a node with a connection between each pair of paired images, e.g., as shown in FIG. 7. The dewarped images 214 are grouped by the depth in the tree, wherein depth in the tree is a measure of how far removed a given node is from the root. For group 1 images, the pair-wise relative warp data 216 is for a relative warp with respect to the master image 206, and for group i+1 images, the relative warp data 216 with respect to the master is obtained by summing the pair-wise relative warp of the respective image with corresponding relative warp data of the group i image with respect to the master image 206. Computation for each group is repeated in the order of increasing group number until relative warp with respect to master image 206 is computed for all first images 204. The warp estimation shown in FIG. 10 is used in method 200 in a pair wise manner, wherein the two dewarped images 214 in a given pair or one of the dewarped images 214 and the master image 206 are used, e.g., as bands 1 and 2 in FIG. 10, to compute 128 and 130 gradients, compute 132 and 134 noise, and so forth, as described above with reference to method 100.

Figure 11:
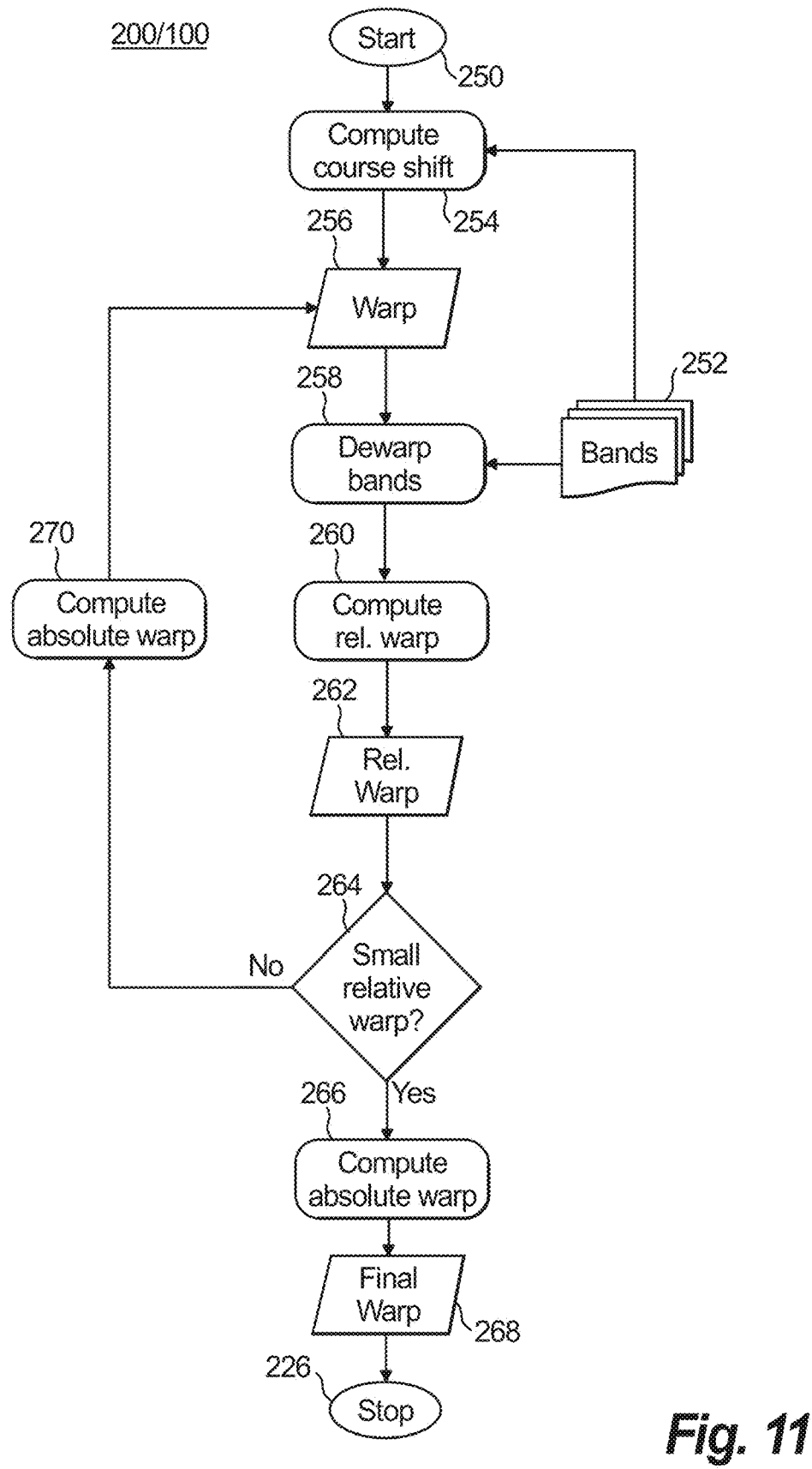
FIG. 11 is a schematic view of the methods of FIGS. 8 and 9, showing the iterative loop and escape condition.

With reference now to FIG. 11, the complete process for method 200, which can also be readily applied to method 100, is shown from start 250 to stop 226. Based on the bands 252 or images provided, a coarse shift is computed 254 as described above to provide a warp 256, e.g., as explained above for coarse warp 102/202, which is in turn used to produce dewarped bands 258 of the original bands 252. Relative warp is computed 260 to produce relative warp data 262. This may include computing pair-wise relative warp 216 and then computing the relative warp with respect to the master 219 as described in method 200. The magnitude or size of the relative warp is evaluated 264, and if the relative warp is small, e.g., below a predetermined threshold, the absolute warp is computed 266 into a final warp 268, that can be used to produce the registered output images at stop 226. If the magnitude or size of the relative warp is not small, e.g., is not below the predetermined threshold, the absolute warp is computed 270 and used as the warp 256 so the process can be repeated iteratively from the warp 256 to the evaluation 264 until the stop condition described above is reached.

Those skilled in the art will readily appreciate that a system for registering images can include a module configured to implement machine readable instructions to perform one or more of the method embodiments described above.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The methods and systems of the present disclosure, as described above and shown in the drawings, provide for imagery with superior properties including improved multi-band/multi-spectral image registration. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of registering images comprising:
obtain a master image from a first image sensor sensitive in a first band;

obtain a first image from a second image sensor sensitive in a second band different from the first band:

identifying a coarse warp for estimated registration of the first image from the second image sensor and the second band to the master image from the first image sensor and the first band;

applying the coarse warp to the first image from the second image sensor and the second band to produce a dewarped image;

identifying a block size of pixels for relative warp estimation on a block by block basis to improve registration of the dewarped image to the master image from the first image sensor and the first band;

performing the relative warp estimation on a block by block basis to produce relative warp data, wherein the relative warp data includes a warp vector for each block of the master image from the first image sensor and the first band and its associated uncertainty, wherein uncertainty is covariance of an optimal translation of the relative warp estimation;

fitting a warp model to the relative warp data to produce reduced noise relative warp data;

combining the reduced noise relative warp data with the coarse warp to produce a refined warp;

applying the refined warp to the first image from the second image sensor and second band for improved registration of the first image from the second image sensor and the second band to the master image from the first image sensor and the first band; and outputting a composite image in a non-transitory tangible medium of the master image from the first image sensor and the first band and a final dewarped image of the first image from the second image sensor and the second band.

2. The method as recited in claim 1, further comprising:
iteratively repeating a process of identifying a coarse warp, applying the coarse warp, identifying a block size, performing the relative warp estimation, fitting a warp model, combining the reduced noise relative warp data with the coarse warp, and applying the refined warp to the first image as recited in claim 1, wherein on a first iteration of the process, the coarse warp is an identity map, and wherein for each successive iteration of the process, the refined warp of an immediately preceding iteration is used as the coarse warp.

3. The method as recited in claim 2, further comprising:
terminating the iterative repeating of the process upon the relative warp meeting a predetermined condition indicative of a predetermined degree of registration between the dewarped image and the master image, wherein on a final iteration of the process, applying the refined warp to the first image produces a final dewarped image registered to the master image.

4. The method as recited in claim 2, wherein identifying a block size includes identifying a successively more refined block size with each successive iteration of the process.

5. The method as recited in claim 4, wherein each of the coarse, refined, and relative warps includes a warp vector for each block, and wherein applying the respective warp to the first image to produce a dewarped image includes producing a pixel by pixel warp based on the respective warp vectors for the blocks.

6. The method as recited in claim 5, wherein producing the pixel by pixel warp includes interpolation of the warp vectors of the blocks to provide a respective warp vector for each pixel.

7. The method as recited in claim 1, wherein fitting a warp model to the relative warp data to produce reduced noise relative warp data includes smoothing the warp vectors relative to one another to reduce occurrences of outliers among the warp vectors and estimation noise, wherein more smoothing is done where the warp vectors have greater associated uncertainty, and less smoothing is done where the warp vectors have less associated uncertainty.

8. The method as recited in claim 1, wherein the warp model includes a Markov Random Field (MRF) to model smoothness for the relative warp and a Gaussian noise model for modeling uncertainty for the relative warp.

9. The method as recited in claim 1, wherein performing the relative warp estimation includes:
computing gradients for each of the dewarped and master images;
computing noise from the gradients of each of the dewarped and master images;
normalizing the gradients and reducing their magnitudes in areas of high noise to produce normalized gradients for each of the dewarped and master images;
dividing the dewarped and master images into blocks of identified block size;
correlating normalized gradient vectors of the dewarped image and master image for each block to produce correlation for all possible translations between the dewarped image and master image blocks;
finding a translation between the dewarped and master image block that yields maximum correlation to compute an estimated warp vector for each block;
computing uncertainty of the estimated warp vector for each block from the correlation; and
collecting the estimated warp vector and associated uncertainty for each block to produce the relative warp data.

10. The method as recited in claim 9, wherein computing noise from the gradients of each of the dewarped and master images includes computing noise as $\sigma_I$ wherein $$\sigma_I = 1.253(mn[|\nabla I_x - mn[\nabla I_x]|] + mn[|\nabla I_y - mn[\nabla I_y]|])/2,$$

where I denotes either the dewarped or master image whose noise is being computed, $mn[\cdot]$ denotes an operator that computes the average value of its argument, and $$\nabla I_x = \frac{\partial I}{\partial x}, \nabla I_y = \frac{\partial I}{\partial y}$$

denotes the x and y components of the image gradient.

11. The method as recited in claim 9, wherein normalizing the gradient of either the dewarped or master image I and reducing their magnitudes in areas of high noise includes computing $$\nabla \bar{I} = \frac{\nabla I}{\sqrt{|\nabla I|^2 + \sigma_I^2}},$$

where $\sigma_I$ denotes the standard deviation of the noise estimated from the gradient image and $$\nabla I = \nabla I_x + j\nabla I_y,$$

is the complex number formed from the x and y component of the image gradient $$\nabla I_x = \frac{\partial I}{\partial x}, \nabla I_y = \frac{\partial I}{\partial y}.$$

12. The method as recited in claim 9, wherein correlating normalized gradient vectors of the dewarped image and master image for each block to produce correlation for all possible translations between the dewarped image and master image blocks includes computing correlation S wherein $$S = |\mathrm{real}(F^{-1}[F[\nabla \bar{I}_1]F[\nabla \bar{I}_2]^*])|,$$

where * denotes the complex conjugate operation, real(•) extracts the real component of the complex number, $\nabla \bar{I}_1$ is the normalized gradient of the master image block, $\nabla \bar{I}_2$ is the normalized gradient of the dewarped image block, F[•] denotes the Fourier transform operator and $F^{-1}[•]$ its inverse.

13. The method as recited in claim 9, wherein computing uncertainty includes computing uncertainty $\hat{C}$ wherein $$\hat{C} = \sum_{d_x, d_y} P(d_x, d_y) \begin{bmatrix} (d_x - \hat{d}_x)^2 & (d_x - \hat{d}_x)(d_y - \hat{d}_y) \\ (d_x - \hat{d}_x)(d_y - \hat{d}_y) & (d_y - \hat{d}_y)^2 \end{bmatrix},$$

where $\{\hat{d}_x, \hat{d}_y\}$ denotes the translation where the correlation S is maximized and the summation is done over all possible translations $\{d_x, d_y\}$ between the blocks of the dewarped and the master image; the probability is computed as $$P(d_x, d_y) = \frac{L(d_x, d_y)}{\sum_{d_x, d_y} L(d_x, d_y)},$$

where the likelihood is computed as $$L(d_x, d_y) = \exp\left(-\left(\frac{\max S}{S(d_x, d_y)}\right)^2\right),$$

from the correlation S and max S denotes the maximum value of the correlation S over all possible translations.

14. The method as recited in claim 1,
wherein identifying a coarse warp for estimated registration of a first image to a master image includes identifying a respective coarse warp for each of a plurality of first images;
wherein applying the coarse warp includes applying the respective coarse warp to each of the first images to produce a respective dewarped image for each of the first images;
wherein identifying a block size includes identifying a respective block size for each of the first images for a warp estimation on a block by block basis to improve registration of the respective dewarped images to the master image;
performing the warp estimation includes:
 forming pairs of the first images and master image to one another wherein at least one of the pairs of images includes one of the first images and the master image;
 performing a pair-wise relative warp estimation for each pair on a block by block basis to produce pair-wise relative warp data, wherein the pair-wise relative warp data includes a warp vector for each block and its associated uncertainty; and
 computing respective set of relative warp data for each of the dewarped images with respect to the master image from the pair-wise relative warp data;
 performing a warp model fit on each set of relative warp data to produce a respective set of reduced noise relative warp data for each dewarped image;
 combining the respective set of reduced noise relative warp data with the respective coarse warp to produce a respective refined warp for each respective dewarped image; and
 applying the respective refined warp to the each respective first image for improved registration of the first images to the master image.

15. The method as recited in claim 14, wherein computing a set of respective relative warp data for each of the dewarped images with respect to the master image from the pair-wise relative warp data includes:
 forming a tree of the pair-wise groupings with the master image as a root and each first image as a node with a connection between each pair of paired images;
 grouping dewarped images by the depth in the tree, wherein depth in the tree is a measure of how far removed a given node is from the root;
 wherein for group 1 images, the pair-wise relative warp data is for a relative warp with respect to the master image;
 wherein for group i+1 images, the relative warp data with respect to the master is obtained by summing the pair-wise relative warp of the respective image with corresponding relative warp data of the group i image with respect to the master image; and
 repeating computation for each group in the order of increasing group number until relative warp with respect to master image is computed for all first images.

16. A system for registering images including:
 a module configured to implement machine readable instructions to perform the method recited in claim 1.

17. A system as recited in claim 16, wherein the module is configured to implement machine readable instructions to
 compute gradients for each of the dewarped and master images;
 compute noise from the gradients of each of the dewarped and master images;
 normalize the gradients and reducing their magnitudes in areas of high noise to produce normalized gradients for each of the dewarped and master images;
 divide the dewarped and master images into blocks of identified block size;
 correlate normalized gradient vectors of the dewarped image and master image for each block to produce correlation for all possible translations between the dewarped image and master image blocks;
 find a translation between the dewarped and master image block that yields maximum correlation to compute an estimated warp vector for each block;
 compute uncertainty of the estimated warp vector for each block from the correlation; and
 collect the estimated warp vector and associated uncertainty for each block to produce the relative warp data.

18. A system as recited in claim 16,
wherein identifying a coarse warp for estimated registration of a first image to a master image includes identifying a respective coarse warp for each of a plurality of first images;

wherein applying the coarse warp includes applying the respective coarse warp to each of the first images to produce a respective dewarped image for each of the first images;

wherein identifying a block size includes identifying a respective block size for each of the first images for a warp estimation on a block by block basis to improve registration of the respective dewarped images to the master image;

performing the warp estimation includes:
   forming pairs of the first images and master image to one another wherein at least one of the pairs of images includes one of the first images and the master image;
   performing a pair-wise relative warp estimation for each pair on a block by block basis to produce pair-wise relative warp data, wherein the pair-wise relative warp data includes a warp vector for each block and its associated uncertainty; and
   computing respective set of relative warp data for each of the dewarped images with respect to the master image from the pair-wise relative warp data;
   performing a warp model fit on each set of relative warp data to produce a respective set of reduced noise relative warp data for each dewarped image;
   combining the respective set of reduced noise relative warp data with the respective coarse warp to produce a respective refined warp for each respective dewarped image; and
   applying the respective refined warp to the each respective first image for improved registration of the first images to the master image.

19. A method of registering images comprising:
   obtain a master image from a first image sensor sensitive in a first band;
   obtain a first image from a second image sensor sensitive in a second band different from the first band;
   identifying a block size of pixels for a warp estimation on a block by block basis to improve registration of the first image from the second image sensor and the second band to the master image from the first image sensor and the first band;
   performing the relative warp estimation on a block by block basis to produce relative warp data, wherein the relative warp data includes a warp vector for each block of the master image from the first image sensor and the first band and its associated uncertainty, wherein uncertainty is covariance of an optimal translation of the relative warp estimation;
   performing a warp model fit on the warp data to produce reduced noise warp data;
   applying the reduced noise warp data to the first image from the second image sensor and the second band for improved registration of the first image from the second image sensor and the second band to the master image from the first image sensor and the first band;
   outputting a composite image in a non-transitory tangible medium of the master image from the first image sensor and the first band and a final dewarped image of the first image from the second image sensor and the second band.

* * * * *